United States Patent
Chen et al.

(10) Patent No.: US 8,464,520 B2
(45) Date of Patent: Jun. 18, 2013

(54) CONTROL OF DIESEL PARTICULATE FILTER REGENERATION DURATION

(75) Inventors: Kevin Chen, Canton, MI (US); Christopher Oberski, Plymouth, MI (US); Norman Hiam Opolsky, West Bloomfield, MI (US); Peter Mitchell Lyon, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 757 days.

(21) Appl. No.: 12/579,627

(22) Filed: Oct. 15, 2009

(65) Prior Publication Data

US 2011/0047982 A1 Mar. 3, 2011

Related U.S. Application Data

(60) Provisional application No. 61/237,968, filed on Aug. 28, 2009.

(51) Int. Cl.
*F01N 3/00* (2006.01)

(52) U.S. Cl.
USPC .............. 60/295; 60/274; 60/297; 60/311

(58) Field of Classification Search
USPC .............. 60/274, 276, 285, 295, 297, 311
See application file for complete search history.

(56) References Cited

U.S. PATENT DOCUMENTS

| | | | |
|---|---|---|---|
| 6,199,375 B1 | 3/2001 | Russell | |
| 6,397,587 B1 | 6/2002 | Van Nieuwstadt et al. | |
| 6,634,170 B2 * | 10/2003 | Hiranuma et al. | 60/295 |
| 6,978,604 B2 | 12/2005 | Wang et al. | |
| 7,137,246 B2 | 11/2006 | Van Nieuwstadt et al. | |
| 7,219,493 B2 * | 5/2007 | Tsutsumoto et al. | 60/297 |
| 7,299,626 B2 * | 11/2007 | Barasa et al. | 60/297 |
| 2009/0044514 A1 | 2/2009 | Brahma et al. | |
| 2009/0151330 A1 | 6/2009 | Chamarthi et al. | |

* cited by examiner

*Primary Examiner* — Thomas Denion
*Assistant Examiner* — Diem Tran
(74) *Attorney, Agent, or Firm* — Julia Voutyras; Alleman Hall McCoy Russell & Tuttle LLP

(57) ABSTRACT

Termination of regeneration of a particulate filter may be based on a variable percent threshold of stored particulate, where the percent threshold of stored particulate depends on a current soot burn rate. In one example approach, a method for controlling regeneration of a diesel particulate filter comprises: terminating regeneration based on a particulate burning rate; wherein the particulate burning rate is based on operating conditions of the diesel particulate filter; the operating conditions including an amount of stored particulate in the diesel particulate filter and a temperature of the diesel particulate filter.

9 Claims, 5 Drawing Sheets

CONTROL OF DIESEL PARTICULATE FILTER REGENERATION DURATION

CROSS REFERENCE TO RELATED APPLICATION

The present application claims priority to U.S. Provisional Patent Application No. 61/237,968, filed Aug. 28, 2009, titled "CONTROL OF DIESEL PARTICULATE FILTER REGENERATION DURATION," the entire contents of each of which are incorporated herein by reference.

FIELD

The present invention relates to diesel particulate filter regeneration.

BACKGROUND AND SUMMARY

Emission control devices, such as diesel particulate filters (DPF), may reduce the amount of soot emissions from a diesel engine by trapping soot particles. Such devices may be regenerated during operation of an engine, such as a turbocharged engine, to decrease the amount of trapped particulate matter. Regeneration is typically achieved by raising the temperature of the DPF to a predetermined level, and ensuring that the exhaust gas entering the DPF is of a certain composition.

One approach for controlling filter regeneration terminates a regeneration event when the amount of particulate remaining in the filter falls below a threshold, or alternatively when a percentage of particulate filter storage (relative to a total capacity) falls below a percentage threshold.

However, the inventors herein have recognized issues with such an approach. For example, under some operating conditions, the amount of time it takes to remove particulates at lower storage levels can be considerable. Thus, regeneration duration may be extended significantly during such operating conditions. Extending regeneration under such conditions to remove only small amounts of particulate can be inefficient, particularly in terms of fuel economy due to the additional fuel spent maintaining elevated regeneration temperatures.

In one example approach, the above issue can be at least partially addressed by a method for controlling regeneration of a diesel particulate filter in an engine exhaust, comprising: terminating regeneration based on a particulate burning rate. For example, during some conditions, even at lower particulate storage levels, a sufficiently high soot burning rate may occur. Under such conditions, the regeneration may be terminated at a lower soot storage level, thus allowing longer storage during a subsequent storage operation of the filter. However, under other conditions, during lower particulate storage levels, the soot burning rate may be sufficiently low that the regeneration is terminated at a higher soot storage level. Thus, even though a subsequent storage operation may be reduced, this is a lower penalty than continuing regeneration.

In one particular example, regeneration termination may be based on a variable threshold of stored particulate, where the threshold of stored particulate depends on a current soot burn rate. The regeneration termination may be further based on vehicle speed. In such an approach, the duration of a regeneration event may be extended to further reduce the amount of soot stored at low levels depending on whether the soot burning rate is above a threshold. As such, the intervals between regeneration events may be extended under selected conditions where such an extension results in meaningful additional soot removal. In this way, reduced fuel consumption may be achieved by not extending the duration at low soot storage levels when the soot burning rate is below the threshold. Further, it may be possible to achieve reduction in tailpipe emissions due to reduction in emissions penalties from regeneration and improvement in fuel in oil dilution which may potentially extend oil change intervals.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
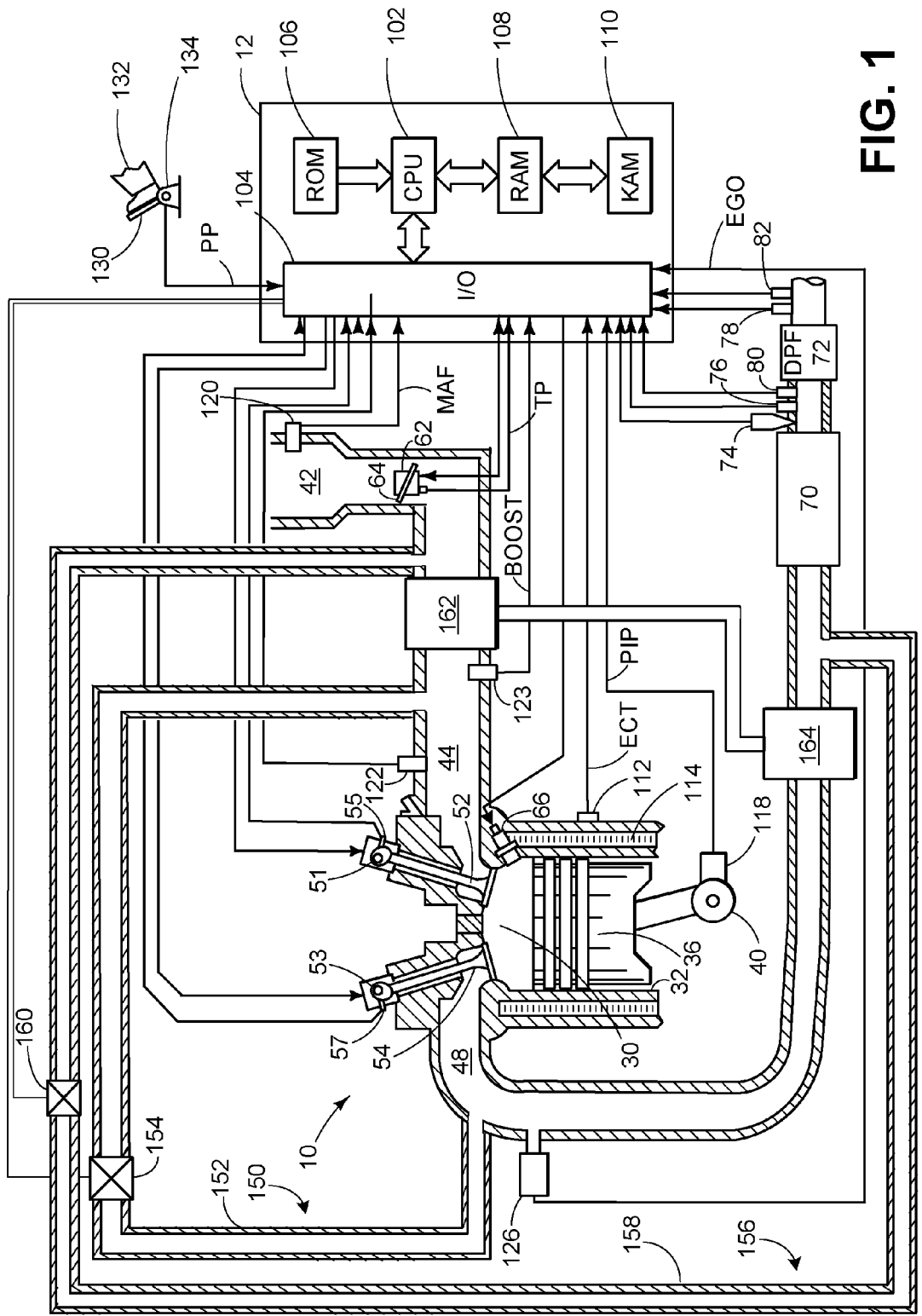
FIG. 1 shows a schematic depiction of an internal combustion engine.
Figure 2:
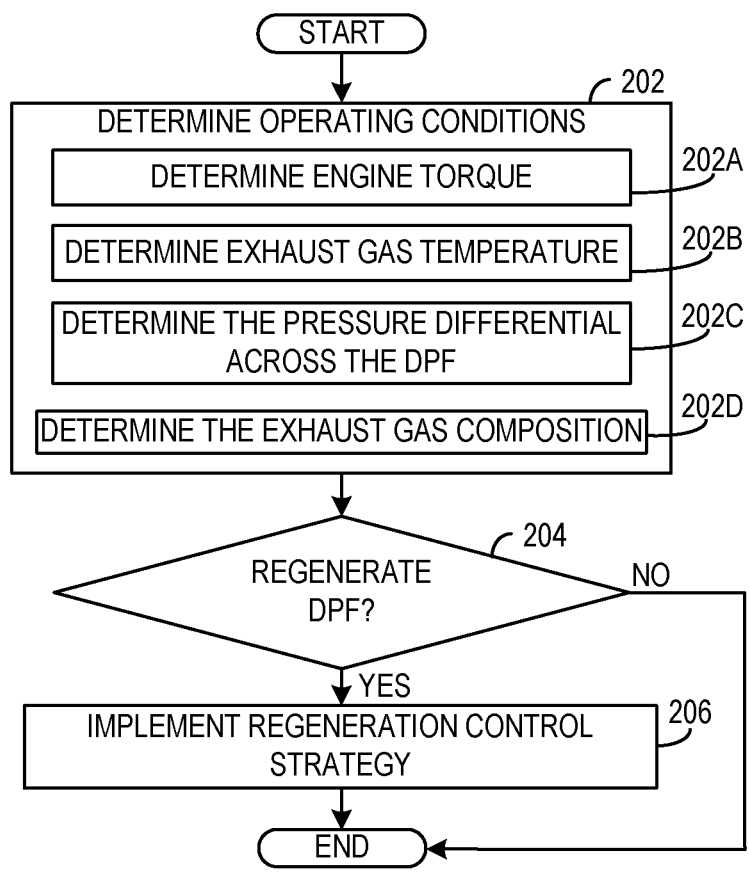
FIG. 2 shows a routine for deciding when to initiate regeneration of a particulate filter.
Figure 3:
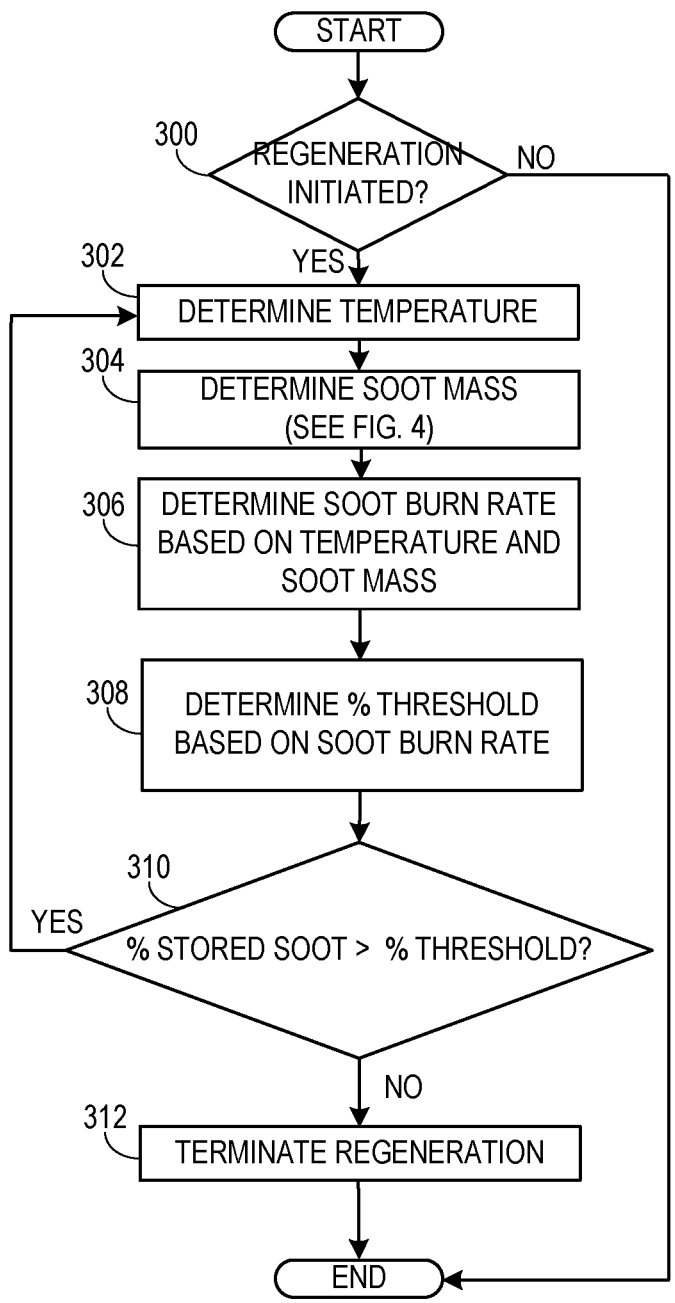
FIG. 3 shows a regeneration duration control routine.
Figure 4:
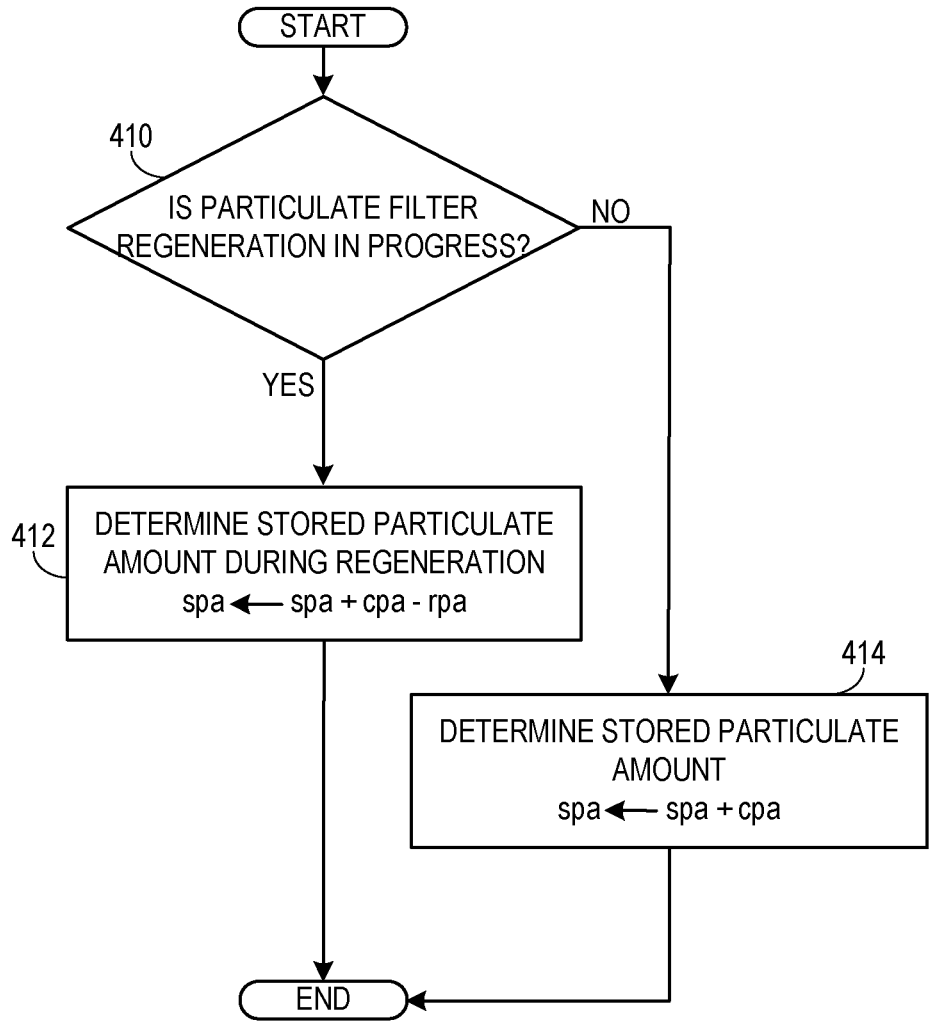
FIG. 4 shows an example routine for determining the amount of stored particulate in a particulate filter.
Figure 5A:
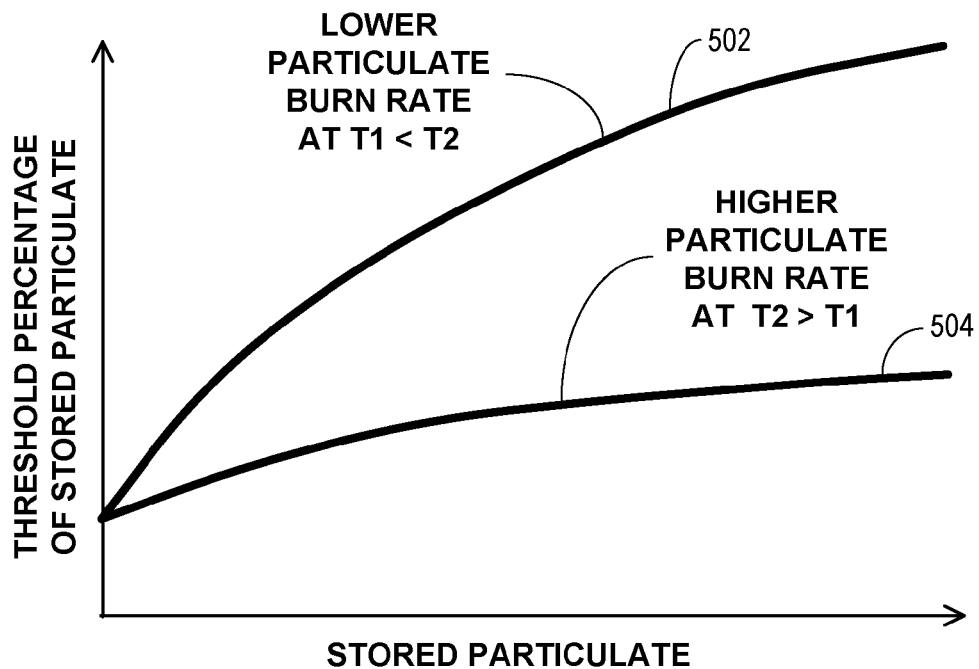
FIG. 5A shows an example graph of how the threshold percentage of stored particulate depends on particulate burn rate and stored particulate.
Figure 5B:
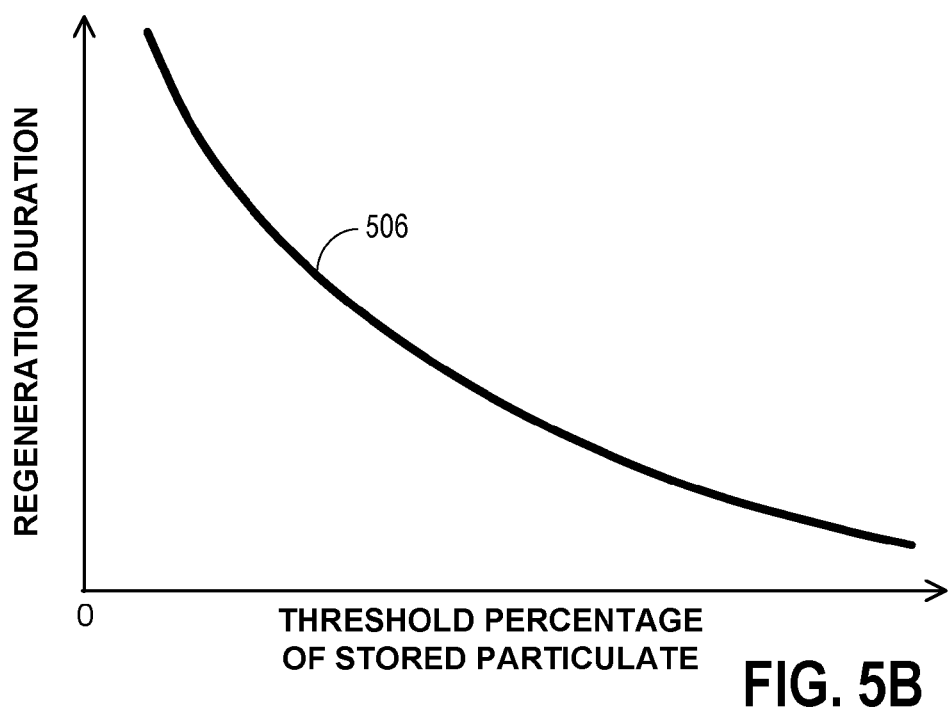
FIG. 5B shows an example graph of how a regeneration duration may increase with a decrease in the threshold percentage of stored particulate.

Particulate filter regeneration may occur during operation of a turbocharged engine such as shown in FIG. 1 to decrease the amount of trapped particulate matter. As shown in the example of FIG. 2, a regeneration event may be initiated in response to engine and exhaust operating conditions. Once regeneration is initiated, a control system may monitor the current state of the particulate filter and vehicle operating conditions to determine when to terminate the regeneration event. FIG. 3 shows an example control routine which monitors the stored particulate and the catalyst temperature to determine a soot burn rate. The routine of FIG. 3 then determines a variable percent stored soot threshold based on the soot burning rate. One example for monitoring the amount of stored particulate in a DPF is shown in FIG. 4. An example graph of how the variable percent stored soot threshold depends on particulate filter temperature and amount of stored particulate in the filter is shown in FIG. 5A. The regeneration event is terminated once the monitored percent of stored soot is less than the variable percent stored soot threshold. In this way, it is possible to take into consideration and take advantage of the current state of the particulate filter burning rate and depending on operating conditions such as particulate loading, filter temperature, and vehicle speed, appropriately terminate the regeneration earlier or later to improve performance. FIG. 5B shows an example graph of how a regeneration duration may increase or decrease as the variable percent stored soot threshold decreases or increases, respectively.

Turning now to FIG. 1, a schematic diagram showing one cylinder of multi-cylinder internal combustion engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include fixed cam timing, or may include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail, which may be a common fuel rail.

Intake manifold 44 may include a throttle 62 having a throttle plate 64. However, in other examples, the throttle may be located in intake passage 42. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air and/or EGR provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

In this embodiment the engine is a diesel engine configured to combust diesel fuel (e.g. petroleum diesel or bio-diesel) via compression ignition. Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_R$, HC, or CO sensor. Emission control device 70 is shown arranged along exhaust passage 48 downstream of exhaust gas sensor 126. Device 70 may include a diesel oxidation catalyst (DOC) and a selective catalytic reduction (SCR) catalyst. An ammonia (or urea) delivery system may be coupled to the SCR catalyst or upstream of the SCR catalyst to deliver reductant to the SCR catalyst.

At least one diesel particulate filter (DPF) 72 may be coupled downstream of the emission control device 70. The DPF may be manufactured from a variety of materials including cordierite, silicon carbide, and other high temperature oxide ceramics. Once soot accumulation has reached a predetermined level (identified via pressure drop, for example), regeneration of the filter may be initiated. Filter regeneration may be accomplished by heating the filter to a temperature that will burn soot particles at a faster rate than the deposition of new soot particles, for example, 400-600° C. In one example, the DPF can be a catalyzed particulate filter containing a washcoat of precious metal, such as platinum, to lower soot combustion temperature and also to oxidize hydrocarbons and carbon monoxide to carbon dioxide and water.

A hydrocarbon (HC) reductant delivery system 74 may be used to deliver HC from the fuel tank or from a storage vessel to the exhaust system to generate heat for heating the particulate filter 72 for regeneration purposes. Alternatively, or in addition, late fuel injection (e.g., during an exhaust stroke) may be used to raise exhaust temperature.

Temperature sensors 76 and 78 may be located upstream and downstream, respectively of DPF 72. The temperature sensors 76 and 78, or additional temperature sensors, may also be located within the DPF, or DPF temperature (or exhaust temperature) may be estimated based on operating conditions using an exhaust temperature model. A differential pressure signal is shown being determined from pressure sensors 80 and 82 upstream and downstream of DPF 72, respectively. Note that a single differential pressure may also be used to measure the differential pressure across DPF 72. A single port gauge pressure sensor (SPGS) may also be used.

It should be appreciated that alternate emission control system configurations may be used in alternate embodiments. For example, emission control device 70 may be coupled downstream of the DPF. Further in other examples, a plurality of diesel particulate filters may be included in the emission control system. Still further, in other examples the SCR catalyst may not be included in the emission control system. Each catalyst, filter, etc., may be enclosed within a single housing or alternatively may be enclosed via separate housings. It will be appreciated that numerous configurations are possible and the configuration depicted in FIG. 1 is exemplary in nature. Further still, as noted above, a reductant (e.g., ammonia or urea) injection system may be coupled to the exhaust to inject urea upstream of emission control device 70.

To regenerate the DPF a regeneration injection strategy may be implemented. The regeneration injection strategy may implement an injection profile including a plurality of injection events such as a pilot fuel injection, a main fuel injection, a near post fuel injection, and/or a far post fuel injection. It will be appreciated that the aforementioned fuel injections may include a plurality of injection events, in other embodiments. Thus, the DPF may be regenerated during operation of the engine. For example, the temperature downstream of a DOC and upstream of a DPF may be controlled to a desired value to promote combustion of particulate matter within the DPF, by adjustment of the amount of the various injections. In this example, a temperature set-point downstream of the DOC and upstream of the DPF may be established to facilitate regeneration of the DPF.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression (e.g. boost) provided to one or more cylinders of the engine via a turbocharger or supercharger may be varied by controller 12. Further, a sensor 123 may be disposed in intake manifold 44 for providing a BOOST signal to controller 12.

Engine 10 may further include a high pressure EGR system 150. High pressure EGR system 150 includes an EGR conduit 152 coupled to the exhaust 48 upstream of turbine 164 and coupled to the intake 44 downstream of compressor 162. High pressure EGR system 150 may include an EGR valve 154 disposed along EGR conduit 152 to control exhaust flow through EGR system 150. Engine 10 may also include a low pressure EGR system 156. Low pressure EGR system 156 includes an EGR conduit 158 coupled to the exhaust 48 downstream of turbine 164 and coupled to the intake 44 upstream of compressor 162. Low pressure EGR system 156 may include an EGR valve 160 disposed along EGR conduit 152 to control exhaust flow through EGR system 156.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 106 can be programmed with computer readable data representing instructions executable by processor 102 for performing the methods and control strategies described below as well as other variants that are anticipated but not specifically listed.

As described above, FIG. 1 shows only one cylinder of a multi-cylinder engine; however it should be appreciated that each cylinder may similarly include its own set of intake/exhaust valves, fuel injector, spark plug, etc.

Turning now to FIG. 2, an example routine for initiating particulate filter regeneration is shown. The routine in FIG. 2 may be implemented utilizing the systems and components described above. Specifically, in some examples, the emission control system may include a DPF positioned downstream of a DOC which is positioned downstream of a turbocharger turbine in an exhaust of an internal combustion engine. However, it will be appreciated that alternate arrangements are possible, therefore in other examples the control strategy of FIG. 2 may be implemented utilizing other suitable systems and components.

First, at 202 operating conditions of the vehicle and internal combustion engine are determined. The operating conditions may include determining the torque produced by the engine at 202A, determining the exhaust gas temperature at 202B, determining the pressure upstream and downstream of a DPF at 202C, and determining the exhaust gas composition upstream and/or downstream of the DPF 202D. It will be appreciated that in some examples, the temperature of the exhaust gas downstream of a turbine and upstream of a diesel particulate filter and/or a DOC may be determined at 202B, via measurement or estimation, or combinations thereof.

Next at 204, it is determined if regeneration of the DPF should occur. In some examples, a threshold pressure differential across the DPF may be used to determine if the DPF should be regenerated. However, in other examples, regeneration of the DPF may occur after the vehicle has traveled over a threshold distance or has surpassed a threshold time interval of engine operation, or if the amount of stored particulate is greater than a maximum threshold. If it is determined that the DPF should not be regenerated (NO at 204) the routine ends.

However, if it is determined that the DPF should be regenerated (YES at 204) the routine implements a regenerative control strategy for the DPF at 206. The regenerative control strategy may include establishing a temperature set-point of the exhaust upstream of the DPF, and adjusting operating conditions to increase exhaust temperature to the set-point. In particular, a temperature set-point may be established for a location upstream of a DPF and downstream of a DOC. It will be appreciated that implementing a regenerative control strategy may further include delivering a post fuel injection to the combustion chamber based on steady state conditions. Furthermore, it will be appreciated that the exhaust gas air-fuel ratio may be lean during DPF regeneration to promote removal of the particulate matter in the DPF. In this way the exhaust gas temperature may be altered without adjusting the torque produced by the engine.

Once a particulate filter regeneration event is initiated, for example as described above with reference to FIG. 2, the particulate filter may be monitored by a variety of devices and methods to determine when the regeneration event is to be terminated. FIG. 3 shows an example routine for determining when a regeneration event is terminated based on a variable threshold value.

In the example routine of FIG. 3, the current amount of soot in the filter (sometimes referred to as a soot loading amount) is monitored, and the regeneration is continued until the soot loading amount falls below a threshold, upon which the regeneration is terminated. The threshold is adjusted to account for various operating parameters, including soot burning rate, where the threshold may be decreased under conditions of a relatively higher burning rate, and increased under conditions of a relatively lower burning rate. Also, the threshold soot loading level may be expressed in a variety of ways, such as an absolute loading (e.g., in grams), or as a percentage of the total soot storage capacity of the filter at it current aging state. Specifically, as the filter ages, the total soot storage capacity may be reduced, and in this way the threshold may be adjusted to also account for the aging effect on the filter. For example, a level of aging, or degree of deterioration due to age, etc., may be used to determine the total soot storage capacity.

The soot burning rate may be determined in a variety of ways. For example, it may be estimated based on a current state of the particulate filter as monitored by one or more of a plurality of sensors disposed along the exhaust passage. The current state of the particulate filter may include the temperature of the filter, the amount of stored soot in the filter, and the mass air flow through the filter, for example. The mass air flow through the filter may be based on vehicle speed, for example. As such, the soot burning rate and thus the threshold for determining regeneration termination may be variable and depend on engine and exhaust operating conditions. In one particular example, as the current soot burning rate increases, the threshold is reduced to extend the regeneration duration, and vice versa. FIGS. 5A and 5B, described in more detail below herein, illustrate example dependencies of the threshold on the soot burning rate which may be used to adjust the regeneration duration.

At step 300 in FIG. 3, the routine determines if a regeneration event has been initiated or whether a particulate filter is regenerating. Initiation of particulate filter regeneration may occur in response to various engine and vehicle operating conditions as described above with regard to FIG. 2. The determination of whether a particulate filter is regenerating can be made in various ways, such as, for example, based on a flag set in a control routine, or checking whether the particulate filter has stored particles and/or filter temperature is above a predetermined level. If a regeneration event is not occurring at 300, the routine ends. However, if a regeneration event has been initiated at 300, the routine proceeds to 302.

At 302, the temperature of the particulate filter is determined. The temperature of the particulate filter may be determined by various approaches. In one example, the temperature may be based on measurements from one or more sensors disposed along the exhaust passage, for example sensors 76 and 78 in FIG. 1. Alternatively, the temperature of the particulate filter may be based on model calculations. For example, the temperature may be modeled based on a distributed quantity over the length of the particulate filter rather than based on a single temperature measurement. In another example, the temperature may be estimated based on engine operating conditions using characteristic predetermined maps stored in memory. The engine operating parameters may include engine speed, fuel injection amount, fuel injection timing, and engine temperature, for example.

The routine then proceeds to 304 to determine the current amount of stored particulate, e.g., soot mass, in the particulate filter. The current amount of stored particulate may be determined by a variety of approaches. In one example, the stored particulate amount may be based on the current stored particulate amount and the incremental amount of particulates generated per predetermined sampling time during the combustion process. In this example, the incremental amount of particulates generated per predetermined sampling time may be based on engine operating conditions such as fuel injection amount and engine speed. FIG. 4 described below herein, shows an example approach to determine the current amount of stored particulate.

The routine then proceeds to 306 to determine the soot burn rate based on the temperature of the particulate filter determined in step 302 and the soot mass determined in step 304. The soot burn rate may be determined based on a predetermined lookup table stored in memory, for example. In another example, the soot burn rate may be determined based on model calculations. Such model calculations may be based on operating parameters of the engine and/or exhaust system. For example, the rate of regeneration increases with increasing temperature following an Arrhenius equation. Furthermore, the rate of regeneration decreases as the amount of stored particulate decreases. Thus, for example, the soot burn rate may be determined by functions stored in memory having temperature and stored particulate amounts as inputs.

The routine proceeds to 308 to determine a percent threshold based on the soot burn rate determined in step 306. The percent threshold may be a percent of stored particulate threshold and may be determined based on a predetermined lookup table, for example. In another example, the percent threshold may be determined from a lookup table which is updated based on the age of the particulate filter, engine mileage, and/or other vehicle or engine parameters, for example. The threshold determined at step 308 may be increased in response to an increased particulate burn rate and decreased in response to a decreased particulate burn rate, for example.

In contrast to having a set percent threshold which determines when a regeneration event is terminated, the variable percent threshold determined at step 308 may be adaptively based on vehicle, engine, and/or exhaust parameters such as the amount of stored particulate, exhaust temperature, and/or vehicle speed, for example.

At 310, the routine then compares the percent stored particulate, e.g. based on the soot mass determination from step 304, with the percent threshold determined in step 308. If the percent stored particulate is greater than the percent threshold at 310, the routine continues back to 302 to repeat the monitoring routine while continuing the regeneration event. However, if the percent stored particulate is less than or equal to the percent threshold at 310, the routine proceeds to 312. At 312, the routine terminates the regeneration event, by adjusting a post injection, for example, and then ends.

Referring now to FIG. 4, an example routine is described for determining an amount of stored particulate in a particulate filter. First, in step 410, a determination is made as to whether the particulate filter is currently undergoing regeneration. The determination of whether a particulate filter is regenerating can be made in various ways, such as, for example, based on a flag set in a control routine, or checking whether the particulate filter has stored particles and temperature is above a predetermined level. When the answer to step 410 is YES, the routine continues to step 412.

In step 412, the routine determines the stored particulate amounts during regeneration by including the particulates generated by the combustion process (cpa), the current stored particulate amount (spa), and the amount of particulates released during the regeneration stage (rpa). Otherwise, the routine moves to step 414 and determines the stored particulate amount based on the current stored particulate amount and the particulates produced during the combustion process. In one example, the amount of particulates generated during the combustion process (cpa) may be determined based on engine operating conditions such as fuel injection amount and engine speed. Also, the amount of released particulates during the regeneration process (rpa) may be determined based on exhaust gas space velocity and particulate filter temperature (tp).

Turning to FIG. 5A, an example graph illustrating the dependency of the threshold percentage of stored particulate, as described above with regard to the routine of FIG. 3, on the soot burning rate and amount of stored particulate, is shown. The graph in FIG. 5A shows two example curves 502 and 504 in a plot of threshold percentage of stored particulate versus stored particulate.

Curve 502 shows how the percentage threshold depends on stored particulate when the particulate burn rate is at a low value as compared with the particulate burn rate associated with curve 504. The lower particulate burn rate associated with curve 502 may be due to a particulate filter temperature T1 which is lower than the particulate filter temperature T2 associated with the higher particulate burn rate curve 504.

As seen in both curves 502 and 504, the threshold percentage increases as the stored particulate increases. An increase in the threshold percentage results in a decrease in the regeneration duration. The dependency of a regeneration duration on threshold percentage of store particulate is demonstrated by the graphical example shown in FIG. 5B. Thus as stored particulate increases in FIG. 5A, the threshold percentage increases for both curves 502 and 504, leading to a decrease in regeneration duration as shown by curve 506 in FIG. 5B.

Thus, in adjusting a regeneration duration based on a variable threshold percentage based on the soot burning rate, the interplay of various engine and vehicle parameters is taken into account.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, 1-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling regeneration of a diesel particulate filter in an engine exhaust, comprising:
    during first conditions at a first particulate storage level, burning soot at a higher rate, and terminating the regeneration at a lower soot storage level; and
    during second conditions at the first particulate storage level, burning soot at a lower rate, lower than the higher rate, and terminating the regeneration at a higher soot storage level.

2. The method of claim 1, further comprising terminating regeneration based on a vehicle speed.

3. The method of claim 1, wherein a particulate burning rate is determined based on operating conditions of the diesel particulate filter.

4. The method of claim 3, wherein the operating conditions include an amount of stored particulate in the diesel particulate filter and a temperature of the diesel particulate filter.

5. A system for a vehicle, comprising:
    a particulate filter coupled in an exhaust of the vehicle, and
    a non-transitory computer readable storage medium having instructions encoded thereon for controlling regeneration of the particulate filter, including:
        instructions to initiate particulate filter regeneration in response to vehicle operating conditions and an amount of stored particulate, and
        instructions to terminate the particulate filter regeneration in response to the amount of stored particulate falling below a threshold percentage of stored particulate, the threshold percentage of stored particulate based on a particulate burning rate.

6. The system of claim 5, wherein the instructions include determining the particulate burning rate based on an amount of stored particulate and a catalyst temperature.

7. The system of claim 5, wherein the threshold percentage of stored particulate is further based on a level of aging of the particulate filter.

8. The system of claim 5, wherein the instructions include adjusting a post injection to terminate regeneration.

9. The system of claim 5, wherein the termination of particulate filter regeneration is further based on a vehicle speed.

* * * * *